United States Patent [19]

Nishino

[11] Patent Number: 4,549,766
[45] Date of Patent: Oct. 29, 1985

[54] VEHICLE SEAT HEADREST

[75] Inventor: Takaichi Nishino, Tokyo, Japan

[73] Assignee: Tachikawa Spring Co., Ltd., Tokyo, Japan

[21] Appl. No.: 413,503

[22] Filed: Aug. 31, 1982

[51] Int. Cl.⁴ .............................................. A47C 7/36
[52] U.S. Cl. .................................... 297/396; 297/391; 403/208
[58] Field of Search ............... 297/396, 216, 452, 397, 297/399, 391; 403/208; 248/214

[56] References Cited

U.S. PATENT DOCUMENTS

| 1,775,158 | 9/1930 | Campbell | 403/208 |
| 3,498,670 | 3/1970 | Finch et al. | 297/396 |
| 3,729,228 | 4/1973 | Inoue et al. | 297/396 |

Primary Examiner—William E. Lyddane
Assistant Examiner—Mark W. Binder
Attorney, Agent, or Firm—Sandler & Greenblum

[57] ABSTRACT

A seat structure containing a frame for a back seat, and a panel for a headrest, which panel is welded in a surrounding manner about said frame.

4 Claims, 5 Drawing Figures

VEHICLE SEAT HEADREST

BACKGROUND OF THE INVENTION

This invention relates to a seat for a vehicle such as a car, and particularly to a seat in which a headrest panel is connected integrally to a seat back portion. More particularly, the invention relates to a structure for fixing a headrest panel, comprising a forward portion and a rear portion, to a pipe frame of the seat back portion.

A conventional prior art structure for fixing the headrest panel to a pipe back frame is shown in FIG. 1. In this structure, the lower portion of a metal plate headrest panel B is connected only horizontally, and only in the rear, to the upper part of the reverse U-shaped back frame A shown therein. In the structure, the area for connection is not wide or extensive.

Therefore, when a bending force is applied to the connecting area of A with B, due to shocks to the panel B, this headrest panel B is damaged by being bent or deformed. In particular, the headrest is apt to be deformed when a person sitting in the rear seat collides with the headrest of the front seat, as a result of sudden braking of the vehicle, for example.

SUMMARY OF THE INVENTION

The main object of the invention is, therefore, to provide an improved secure headrest structure which overcomes the drawbacks of the conventional structure.

According to the invention, there is provided a structure wherein the area for connecting the headrest panel to the back frame is increased so as to reinforce the connecting strength and thus, to form a mechanical integrated structure of the headrest and of the seat back. Thus, a novel seat structure is provided which includes a pipe frame for a back seat which has a curved portion at its upper center, and a panel for a headrest which is welded along vertically and/or horizontally spaced portions of the curve of the pipe frame. Additionally, the welds extend along the pipe frame both in the front and the rear thereof, to improve connecting stability.

BRIEF DESCRIPTION OF THE DRAWINGS

The invention is explained in detail with reference to the drawings illustrating the invention.

DETAILED DESCRIPTION OF THE INVENTION

Figure 2:
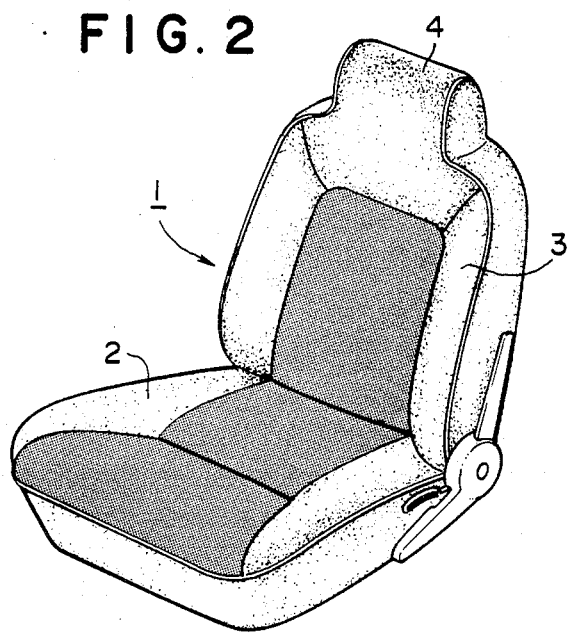
FIG. 2 is a perspective view of a vehicle seat to which the structure of the invention is applied.
Figure 1:
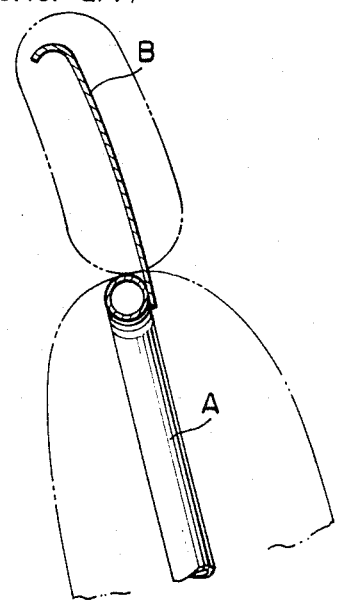
FIG. 1 is a sectional side view showing the connection between a back frame and a headrest panel of the conventional type seat.

In FIG. 2, reference 1 designates generally the vehicle seat according to the invention and reference 2 represents a seat cushion. Seat back 3 of the seat 1 is provided with a headrest 4 of the invention.

Figure 3:
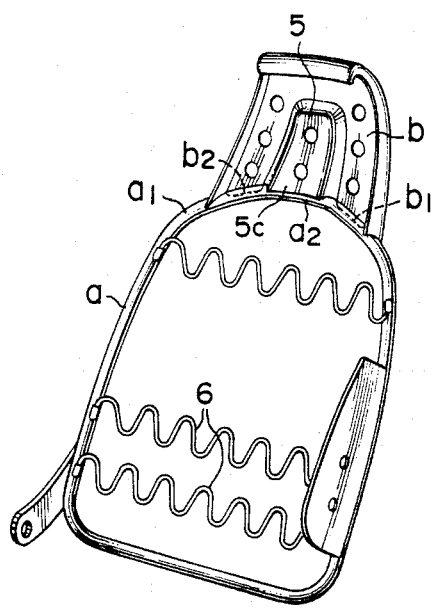
FIG. 3 is a perspective view of a back frame to which a headrest panel is connected.

As illustrated in FIG. 3, a back frame "a" of seat back 3 is so constituted that center portion a2 of the upper part of pipe frame "a" is generally curved. Head rest panel "b", comprising an upstanding fixed portion 5, is secured to the curved center a2 at varying distances along the pipe frame.

The fixed portion or member 5 is swelled or extended forward at the middle portion of panel "b", a depth substantially the same as that of the diameter of the curve a2 of the pipe frame "a". Both sides of the lower part of fixed portion 5 are provided with recesses 5a, 5b, corresponding to the curvature at a2 of and abutting the panel, while the bottom forward margin 5c is located a distance away from the rear portions b1, b2 of the panel, which are welded to pipe frame "a". This distance, in its horizontal component, corresponds to the diameter of the curved pipe a2.

Figure 4:
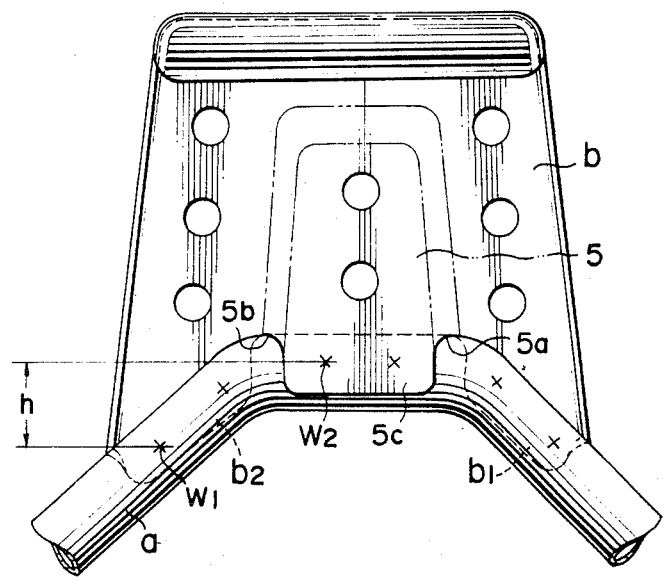
FIG. 4 is a frontal view of the top portion of the panel-frame structure of FIG. 3 and of larger scale.

It will be appreciated that the lower portion of headrest panel "b" is located between rear welded portions b1, b2 of the rear side and lower margin 5c of the fixed portion 5 of the front side, and welded portions b1, b2 and lower margin 5c are spot-welded to the curve a2 of the frame "a" (FIGS. 3 and 4).

Figure 5:
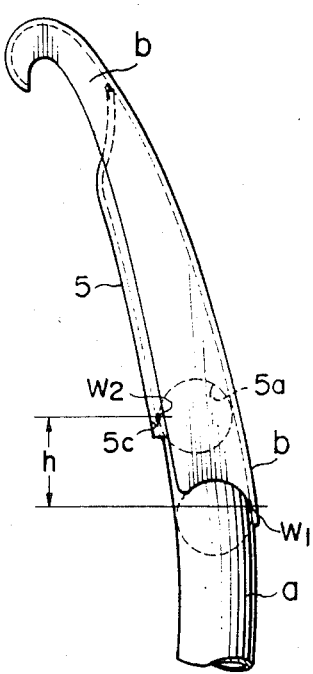
FIG. 5 is a side view of the structure of FIG. 4.

When panel "b" is connected to frame "a", the vertical distance "h" between welding points w1, of b2, for example, and w2 is increased as compared to the prior art. Further, since welding points w1 and w2 are spotted along diametrically opposite sides of curve a2, the connecting area of the panel "b" to the frame "a" is large (FIGS. 4 and 5).

In FIG. 3, reference number 6 indicates an S spring expanded between the sides of frame "a". Although frame "a" of this embodiment is made of closed pipe, it can be made of a reverse U-shaped pipe, having open ends connected by a connecting arm. Further, welding techniques other than spot welding can also be adapted to this invention.

As explained above, since the upper curved portion of the frame is welded in a surrounding or sandwiched manner by the front and rear lower margins of the headrest panel, the vertical and horizontally separated connecting areas are large. Accordingly, the connecting strength is increased over conventional headrest panels.

Furthermore, the connecting structure is strong enough to withstand shock applied from the rear side, particularly from the upper oblique rear side, as well as from the front side. Thus, the headrest is mechanically integrated to the seat back, and it protects the person on the seat from the shock applied to it. Further, the structure itself is simple and is, therefore, easy to produce.

A headrest pad and a seat pad are arranged on frame "a", and further a trim cover is applied thereon in accordance with conventional techniques.

I claim:

1. A vehicle seat comprising a seat back frame in the form of a generally curved pipe having a central upper portion and a headrest panel integrally connected to said frame, said headrest panel being secured to front and rear sections of said pipe, said head rest panel comprising a unitary metal plate including at least one rear member secured to said rear pipe section and at least one forwardly extending member attached to said pipe front section, at least one of said members being provided with lower recesses which abut an upper surface of said pipe, said panel being integrally connected to said seat back frame by welding said members to said pipe, said rear and forwardly extending members being secured to said curved pipe at different vertical extents, one of said at least one members comprising two spaced portions attached to said pipe at horizontally spaced locations, the other of said at least one members being attached to an opposed side of said pipe between said spaced locations, none of said members extending below said pipe.

2. A vehicle seat in accordance with claim 1 wherein said at least one rear member comprises said two portions, and wherein said forwardly extending member is attached to said front pipe section.

3. A vehicle seat in accordance with claim 1 wherein said at least one rear member extends generally vertically lower than said at least one forwardly extending member.

4. A vehicle seat in accordance with claim 1, wherein said curved pipe is unending and corresponds to the shape of the seat back frame.

* * * * *